United States Patent [19]
Graefnitz

[11] 3,849,876
[45] Nov. 26, 1974

[54] MANUFACTURE OF WATT-HOUR METERS WITH WELDED PRECISE TORQUING

[75] Inventor: Russell F. Graefnitz, Lafayette, Ind.

[73] Assignee: Duncan Electric Company, Inc., Lafayette, Ind.

[22] Filed: Sept. 8, 1972

[21] Appl. No.: 287,232

[52] U.S. Cl. ............ 29/596, 29/205 R, 29/593, 310/42, 310/67 R, 324/74, 324/137
[51] Int. Cl. ............................ H02k 15/00
[58] Field of Search ............. 29/596, 593, 205 R; 324/74, 137, 138; 310/42, 67, 154, 254

[56] References Cited
UNITED STATES PATENTS

| | | | |
|---|---|---|---|
| 1,835,750 | 12/1931 | Beusch | 324/138 |
| 2,957,131 | 10/1960 | Burkhart, Jr. | 324/74 |
| 3,401,282 | 9/1968 | Zagorski | 310/42 |
| 3,409,829 | 11/1968 | Elmore et al. | 324/74 |
| 3,611,137 | 10/1971 | Graefnitz et al. | 324/138 |

Primary Examiner—C. W. Lanham
Assistant Examiner—Carl E. Mall
Attorney, Agent, or Firm—Darbo, Robertson & Vandenburgh

[57] ABSTRACT

The two electromagnets making up a watt-hour meter stator are locked to separate carriages, one adjustable vertically and the other horizontally. The torque they exert on an appropriately correlated disk is measured at two widely different current values, with adjustment of the vertical pole spacing after measuring at the higher amperage, and relative lateral adjustment after measuring at the lower amperage, to bring the stator within a predetermined narrow torque range in each instance. Welding retains the adjustment thus achieved, the welding being on an edge where it is readily removed in the rare instances where readjustment proves necessary. A computer may be used to compute the shifting needed, and to sequence the various steps. A plurality of such stators driving one disk are inherently torque balanced. Final calibration is quickened and accuracy improved.

7 Claims, 4 Drawing Figures

MANUFACTURE OF WATT-HOUR METERS WITH WELDED PRECISE TORQUING

INTRODUCTION

This invention lies in the field of watt-hour meters, a well-known example of which is the electricity meter by which the charges for use of electricity in a home are determined.

The disk of a watt-hour meter, the one moving part noticed by homeowners, is driven by interaction with it of two electromagnets forming a gap through which it rotates. The two electromagnets are magnetically and physically coupled and are together called a "stator" or "driving unit". The stators are of course mass produced, and on visual observation would seem to be identical. Nevertheless, small variations between individual stators made by a given manufacturer has given rise to various difficulties or problems.

Very minute variations between stators can be the cause of differing torques exerted by them for driving their respective disks. Of course, adjustments have been provided for overcoming or offsetting the inequalities of torque, so that as sold all of the meters would have a high degree of accuracy.

The variations of torque prior to adjustment have necessitated providing adjustment means having a rather wide range. Furthermore, making the adjustments through the wide range has retarded the final calibrating or adjusting-to-accuracy of the meters in the manufacturing operation. Other difficulties resulting from variations of torque in unadjusted stators are well known to meter manufacturers.

There is a special problem in connection with polyphase meters using a plurality of stators to drive a disk or other rotative element shared by the two stators. Here it has been necessary to provide special balancing adjustments to equalize the torques of the various stators because the calibrating adjustments such as are used on single stator meters will not accomplish balancing between stators. The main calibrating adjustment has usually been a change by one means or another of the retarding force applied to a disk by its damping magnets. With two stators of different torques, the retarding force which makes one stator accurate will not make the other stator accurate. A compromise adjustment will result in inaccurate readings for both stators, though the maximum inaccuracy is less than without the compromise. According to the present invention, all of these troubles are substantially eliminated by shifting one of the electromagnets with respect to the other to provide predetermined torque characteristics (within a very narrow range) and then welding the two electromagnets together in this condition of predetermined torque. In the rare instances in which the two electromagnets must later be separated (examples being if a mistake was made the first time or if a coil short circuit develops), separation is easily accomplished. It is merely necessary to remove the very small amount of metal (at an accessible point along an edge) which contains the weld, as by grinding or filing.

The task of manufacturing stators to a narrow predetermined torque range might seem insurmountable. According to the present invention, it is accomplished, however, by mounting each magnet on its own carriage with each carriage being accurately and almost infinitesimally adjustable by automatic or semi-automatic means. One of the carriages is adjustable vertically to adjust the vertical spacing between the poles, the gap length in which the disk rotates. This adjustment is made after determining the meter's torque at "test amperage" (formerly called full load). The other carriage is adjustable horizontally and is made after testing the meter at a low amperage, following the first adjustment. It has been found that the second adjustment of this type has very little effect on the test amperage torque. Therefore the stator is almost always in a condition within the predetermined narrow range after these two adjustments, and the welding at this time makes this satisfactory condition permanent.

Objects and advantages of the invention will be more apparent from the following description and from the drawings.

DESIGNATION OF FIGURES

BACKGROUND DESCRIPTION

Figures 1, 2:
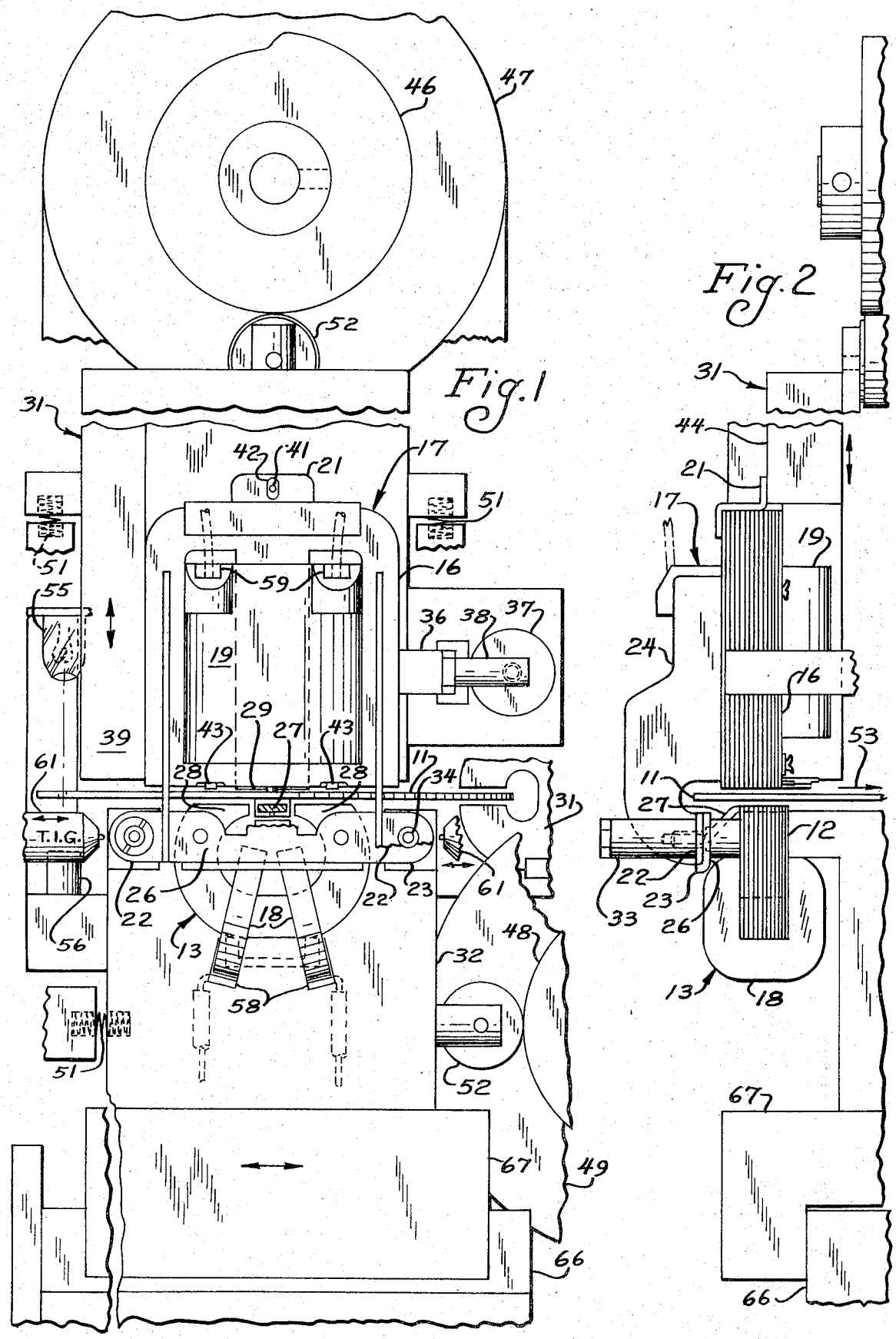
FIG. 1 is a front view of a preferred form of the invention chosen for illustration, with various parts omitted, broken away, or simplified, for the sake of clarity.
FIG. 2 is a fragmentary side view of the embodiment of the invention shown in FIG. 1.
Figure 4:
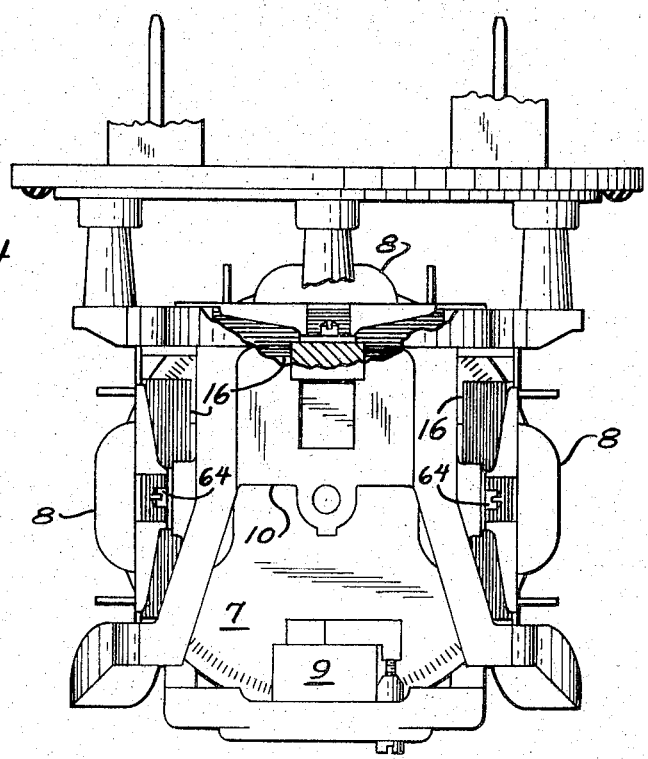
FIG. 4 is a view of a meter with equal-torque stators.

A polyphase watt-hour meter for which this invention is of especial value is shown in FIG. 4. A disk 7 rotates through gaps in three driving units 8 and a damping or retarding unit 9, each carried on frame 10 and acting inductively on the disk. As seen best in FIG. 2, in conjunction with a test disk 11 of this invention, each driving unit includes a stack of laminations 12 forming the core of a current magnet 13 and the stack of laminations 16 forming the core of a voltage magnet 17. The current magnet 13 is a current magnet by virtue of the fact that its winding 18 is connected to be energized by the current flowing through the circuit being measured. The voltage magnet 17 is a voltage magnet by virtue of the fact that its winding 19 is connected across the circuit being measured so as to be responsive to the voltage thereof. In the illustrated form, the voltage magnet 17 is carried by an upper mounting lug 21, and two lower lugs 22. The current magnet 13 is carried by two mounting lugs 23. The mounting lugs 22 and 23 comprise part of the magnetic circuit for the voltage magnet 17. Thus the mounting lugs 22 are formed as part of side plates 24 (which are of magnetic material) in engagement with the stack of laminations 16. The mounting lugs 23 are the ends of a return-flux plate 26 which carries a return tongue 27 extending between the current poles 28 of current laminations 12 (a relationship best seen in FIG. 1). Voltage laminations 16 have a central pole 29 directly opposite the tongue 27, so that a high concentration of voltage flux (magnetism resulting from current in the voltage coil 19) passes between pole 29 and tongue 27. This flux passes through the disk and, being an alternating flux, it induces eddy currents in the disk. Reaction between these eddy currents and the current flux passing through the disk twice in its path from one current pole 28 to the other exerts a driving torque on the meter disk 7 or test disk 11.

A damping magnet system 9 (diagrammatically represented in FIG. 1 by "C" magnet 31) exerts a retarding force on the disk proportional to its speed, with the result that the speed of the disk is proportional to the torque exerted by the stator (or stators in the case of polyphase meters). Thus, if accuracy is assumed, the speed of the disk is proportional to the momentary use of power in the measured circuit. By (in effect) counting the number of revolutions of the disk, the total use of energy in the metered circuit will be measured. The register (the set of pointers which a meter reader reads) converts the count of revolutions to kilowatt-hours.

Adjustment means, not shown, have commonly been provided for being able to adjust, or "calibrate" the meter for accuracy. In polyphase meters, one usual adjustment balanced the stators, so that their torques at "test amperage" were equal. Another adjustment adjusts the effect of the damping unit 8 to provide accuracy of the meter at "test amperage". This is used to be called "full load" calibration, but meters now are accurate for very much higher loads. Another adjustment, a preferred form of which is disclosed in applicant's U.S. Pat. No. 3,611,137, issued Oct. 5, 1971, has heretofore adjusted each stator for accuracy at light loads, commonly at an amperage one-tenth of "test amperage".

DESCRIPTION OF THE PRESENT INVENTION

According to the present invention, the stators 8 are pretorqued very close to a chosen optimum and do not need balancing on the meter. To accomplish this pretorquing, the current electromagnet 13 and the voltage electromagnet 17 are shifted with respect to each other so that, aside from the calibrating adjustments just mentioned, the torque provided by the stator will lie in a narrow predetermined range at heavy load and a narrow predetermined range at light load, the shifting required being determined by test; and the two magnets of the stator being welded together for permanency of this torque-determined positioning.

To accomplish this shifting after test, it has been found most convenient to mount one magnet, in this instance the voltage magnet 17, on a carriage 31 which is vertically adjustable; and to mount the other magnet, in this instance the current magnet 13, on a carriage 32 which is laterally adjustable. Of course, for test purposes the two electromagnets must have the same relationship as they will have in use. Therefore the current magnet 13 is first applied to the carriage 32 and then the voltage magnet 17 is applied to the carriage 31, with the lugs 22 of magnet 17 resting against the lugs 23 of magnet 13. The lugs 22 are clamped against the lugs 23, clamping nuts 33 being illustrated for this purpose. It has been found best to provide a uniform or predetermined degree of pressure between the lugs 22 and 23 during tests. This may be accomplished by tightening nuts 33 with a torque wrench or torque nut-driver so that they will be tightened only to a predetermined torque value. It has been found best to loosen the nuts during the relative shifting of the magnets, after tests, and tighten them again for any succeeding test. In production, clamps operated by air cylinders may be substituted for clamping nuts 33.

For accurately positioning magnet 13 on carriage 32 while permitting slight relative movement of magnet 17, it has been found convenient to use shoulder studs 34. The shoulder portions of studs 34 fit lugs 23 with accuracy-insuring snugness, but do not extend far enough to reach the lugs 22. In any event the holes in lugs 22 are oversize as to the studs 34 within them to permit the relative shifting required, as described below.

To ensure firmness of positioning of the magnet 17 on carriage 31, a clamping finger 36 operated by an air cylinder 37 (which may operate through a crank arm 38) is used. Clamp finger 36 may thrust the stack of laminations against a stop wall or jaw 39. To guard against possible irregularities of the laminations, it is preferred that the stop wall 39 be engaged only by the lower portion of laminations 16, the positioning of the upper portion of magnet 17 being determined by a stud snugly engaging the sides of a vertical slot 42 in mounting lug 21. The vertical positioning of magnet 17 on carriage 31 is determined by support fingers 43. Before clamping finger 36 is actuated, magnet 17 is placed by hand so that it rests on fingers 43, with lugs 22 seated against lugs 23 and lug 21 seated against base plate 44 of carriage 31.

The carriage 31 is adjusted vertically by cam 46 which is driven by a stepping motor 47, which moves the cam 46 in very minute increments. Similarly, carriage 32 is adjusted laterally by cam 48 which is driven by a stepping motor 49. In each instance, the carriage is biased toward the cam, the biasing being diagrammatically represented by springs 51, and a cam follower roller 52 being used. Motors 48 could be provided with speed reducing gearing, but satisfactorily small carriage movements accomplished by the cam, even less than 0.0001 inch per step, have been achieved without gearing.

The disk 11 used in tests is preferably the same type of disk which will be assembled with the stator in building a neter. Preferably it is retractable as indicated by arrow 53 in FIG. 2 so that it will be out of harm's way except, generally speaking, during tests. Thus, it may be backed away after the last test, and moved into accurately predetermined position after magnets have been clamped in place and before the first test.

The duration of a test run is determined by the aid of a lamp 55 which directs a beam of light where it will pass through a perforation in disk 11 when the disk is in a given angular position and at that time will shine on a photocell 56. The relationship of the stator's torque characteristics to a chosen optimum is determined by comparison with a "standard meter" responsive to the same load as is applied to the stator during the test, preferably with a numerical read-out or indication of degree of aberration from the chosen optimum generally in accordance with determination of departure from accuracy in Burkhart U.S. Pat. No. 2,957,132. Preferably the rotating disk type of standard meter there indicated is replaced by equivalent electronic apparatus now already known. The comparison period of each test should be for exactly one revolution of the disk 11, determined by successive actuations of photocell 56. It has been found entirely suitable to reduce the time required for the one revolution by using a damping magnet 31 much weaker than would be used in the final meter, e.g. producing only one-half the retarding effect, and by using a higher amperage for the light-load test than is used in actual meter calibration. The chosen optimum at test amperage is the design torque (the torque which would be expected to require the least average adjustment of the corresponding meter damping magnet adjustment in a starting mid-position). The chosen optimum at the lower amperage is so related to the other chosen optimum as to be expected to require the least average light-load adjustment from a starting mid-position.

SEQUENCE OF STEPS

With the test equipment indicated and the form of stator indicated, the steps taken according to the present invention are as follows:

Assuming the previous stator has been removed, a new current magnet 13 is fitted over the studs 34, the enlarged or shoulder portions of which accurately determine its position on carriage 32. To accommodate unavoidable microscopic variations, the aperture through one of the lugs 23 may be slightly enlarged in the direction lengthwise of the plate 26 so that the lug 23 snugly engages the enlarged shoulder of stud 34 only at the top and bottom.

Next the voltage electromagnet 17 is applied over studs 34 and 41 and is allowed to rest on fingers 43 while pressed home by rearward manual pressure. Air cylinder 37 is actuated to operate finger 36 to clamp the magnet 17 in this position.

Next clamps, such as clamp nuts 33, are applied to hold lugs 22 in firm contact with lugs 23, and a cylinder is actuated to move the disk 11 from its safe retracted position to its illustrated position, accurately determined.

Now the test connections are made: current (phantom load) connections to terminals such as terminals 58 on current coils 18, and voltage connections to terminals such as 59 on voltage coil 19. It has been found convenient to make the voltage connections by actuating an air cylinder to operate a slide causing it to move downwardly and bring spring terminals into contact with terminals 59. The current coils could be connected by similar means, but because of variations in the current coils, manual clip-on connections may be chosen.

After the connections are made, the test circuit is energized, the energization being continued until there has been one full comparison revolution. Successive actuations of a relay by photocell 56 determine the start and end of counting pulses from the electronic standard meter for this revolution; and at the end of the revolution preferably automatically cause either an electronic visible read-out of the numerical figure determined by the comparison equipment, or record this figure in a computer. In either event the figure is used to determine whether the vertical dimension of the gap in which disk 11 rotates should be increased or decreased and how much the change should be. After the pressure of clamps on lugs 22 is released, stepping motor 47 is actuated in the direction required and by the number of impulses required to produce the change in the gap length determined to be needed.

Next the clamping pressure is reapplied to lugs 22 and another comparison run is made, this one at a much lighter load, i.e., with greatly reduced amperage through the current coils 18. Again the electronic equipment provides, from one full revolution of the disk, a number indicating the variance of the torque of the stator from the chosen optimum and a determination made of the direction and amount of relative lateral shift required. The stepping motor 49 is then energized in the direction and by the number of impulses corresponding to this determination to rotate the cam 48 in the direction and by the exact amount required to shift the carriage 32 and with it the electromagnet 13 laterally to produce a change in low amperage or light-load torque to be very close to the predetermined optimum. This lateral adjustment has been found to have very little effect on the already-adjusted torque at "test amperage", and since final meter calibration must be made with the meter's own disk, no further preliminary testing will ordinarily be needed. Of course, it would be entirely possible to program the computer, or manual operation, to provide that with a lateral adjustment exceeding a predetermined level there would be a repeat of the test amperage comparison to determine whether it is within a predetermined proximity of optimum, a readjustment being made if needed.

When the adjustments to be made have been made, i.e., when the relative positioning of the two magnets has been adjusted to predetermined test standards by torque measurements, at widely different loads, the positioning is made permanent by welding. Preferably disk 11 is retracted first, before this welding, thus removing its supporting magnets from proximity to the welding currents. Then torches 61 are moved into position to lightly weld the edges of lugs 22 and 23 together. The torches 61 are preferably tungsten inert gas welding torches so that a very clean weld is provided. The torches 61 are now retracted and the completed stator removed from the torquing equipment and placed with others for use in assembly of meters. The torquing equipment is now ready for torquing another stator.

To extend the statement of steps in condensed manner through the completion of the meters, it is noted first that the stators are assembled in the meters with the same relative position as to the disk as they had with respect to the disk 11 in the torquing apparatus. Accuracy may be determined by precision jigs if necessary. At present, it is believed that sufficient accuracy is achieved by use of shoulder screws corresponding to studs 34 and 41 and similarly engaging their respective apertures. The shank of screw 64 corresponding to the stud 41 may be slightly smaller than the stud 41 to accommodate the unavoidable microscopic variations, accuracy therefore being determined by the screws corresponding to studs 34 in snug engagement with lugs 23 as previously noted for the studs 34. If a precision jig is used, all of the securing screw shanks may be undersized with respect to the apertures in the stator and the accuracy of positioning determined by the precision jig made permanent by a die-casting technique which has been developed for this purpose. Slots are provided through the heads of the respective screws and down along the shanks, thus leading into the oversized apertures, and after the screws have been tightened while the parts are jig-positioned, die-cast metal is injected through the slots into these apertures providing cast in-situ bushings which hold the stators in their positions without reliance on the clamping pressure of the screws.

After assembly, the meter is placed on the usual calibrating rack and calibrated (adjusted to accuracy) generally in the usual manner.

ACHIEVEMENT

The achievements of this invention are most evident in connection with simplifications or improvements of the calibration of the meters in manufacture. The creep test which has usually been deemed necessary or desirable can be omitted. The balancing adjustment, necessary with plural stators subject to a single damping magnet system, may be omitted. The length of time required between the beginning of the comparison runs and the end of calibration based thereon is considerably reduced, on the average, because a single relatively short adjustment of the fullload adjustment and another single relatively short adjustment of the light-load adjustment, in no more instances than similar but greater adjustments were heretofore required, are almost invariably all that is required. Indeed, a single light-load adjustment appears to be enough for the two or three stators of a polyphase meter, instead of one for each stator, as heretofore. If this is found to be sufficiently dependable, the other two stators will not even need to be provided with light-load adjustment means.

The average meter accuracy at the test amperage and light load is likely to be improved because the starting point is better. Average accuracy at points beyond and between the test amperages is likely to be improved even more because the compensations provided in the meters will have been precisely engineered for the "chosen optimum" torque characteristics toward which all stators are adjusted by relative positioning of the two magnets.

FURTHER DETAILS

The torque-adjusting carriages 31 and 32 and the retraction carriage (not shown) for disk 11 should all be precision carriages. Mounting them on precision ball slides has been found suitable. Each of these ball slides, only one being shown, includes base 66 and moving saddle 67, and a play-free ball system, not shown. Preferably two such slides are provided for carriage 32, the one not shown being parallel to it at the rear end of the carriage 32 (to the right in FIG. 2). Carriage 32 is relatively long, front to rear, and carries on it the carriage, not shown, for retracting disk 11, so that the disk moves with carriage 32. The carriage for disk 11 must be accurately stopped in its active position, and a screw-adjustable stop has been found suitable. This slide should hold the disk accurately centered vertically in the expected height (gap-length) of the disk gap.

Figure 3:
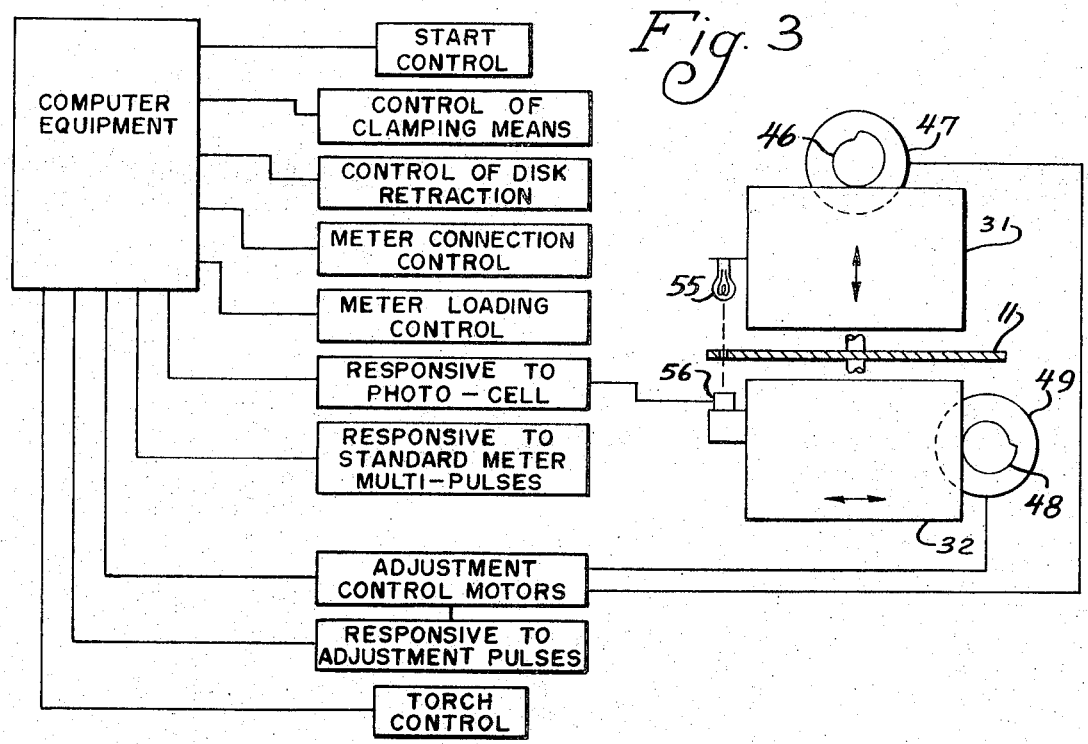
FIG. 3 is a diagrammatic view indicating computer control.

The computer control system, if used, can be a simplified and somewhat modified version of that disclosed in Elmore et al. U.S. Pat. No. 3,409,829 issued Nov. 8, 1968. Major sections of it are diagrammed in FIG. 3. No further explanation is believed needed.

Although the details of the damping unit are not part of this invention, the preferred form is one in which one of two disk-receiving gaps in a magnetic circuit is adjustably by-passed, the by-pass of nonpermanent magnetic material including a cylindrical sleeve screwing progressively onto a stud to have progressively more of its length in engagement with the side of a pole portion of a permanent magnet energizing the circuit, the stud being in sprung condition to maintain contact pressure and eliminate backlash.

In case any details of the preferred form of meter are not shown or described, the form now sold by Duncan Electric Company, Inc. as its MT meter is the preferred form. The chosen optimum torque values for these meters are 30 millimeter grams per stator at test amperage, and 3 mmg at 1/10 test amperage, except that with three stators and some other meters the figures are 25 and 2.5 respectively. This of course assumes rated voltage. The depth of welding by torches 61 is approximately 0.05 inch.

Additional details of the preferred form of the apparatus used are believed not to affect the heart of the invention toward which claims are drawn, but to be sure of complying with 35 US 112, some which might not be assumed by those skilled in the art are set forth as follows:

Cam 48, motor 49 and follower 52 are preferably under carriage 32 about midway of its front-to-rear length, and thrust the carriage to the right against spring means (a stack of Belleville washers) biasing the carriage to the left.

The MT meter mentioned is disclosed in brochures of Duncan Electric Company, Inc.

I claim:

1. The method of assembling a pair of electromagnets to form a stator for a dynamoelectric instrument, including the steps of providing each electromagnet with spaced lugs of magnetic material adapted to slidingly engage similarly spaced lugs on the other electromagnet; placing the two electromagnets in approximately correct relationship to one another with the lugs slidingly engaged to each other, testing the stator as to torque characteristics, accurately adjusting the relationship between the two electromagnets to approach a chosen optimum of torque characteristics, and welding the two electromagnets in their exact relative relationship as a separate stator for mounting in a meter without disturbing their relationship.

2. The method of assembling a pair of electromagnets to form a stator for a dynamoelectric instrument, including the steps of providing each electromagnet with spaced lugs of magnetic material adapted to slidingly engage similarly spaced lugs on the other electromagnet; placing the two electromagnets in approximately correct relationship to one another with the lugs slidingly engaged to each other, testing the stator as to torque characteristics, accurately adjusting the relationship between the two electromagnets to approach a chosen optimum of torque characteristics, and welding the two electromagnets in their exact relative relationship as a separate stator for mounting in a meter without disturbing their relationship, with the welds localized at an accessible spot on an exposed edge to be readily removed if need for separation should arise.

3. The method of assembling a pair of electromagnets to form a stator for a dynamoelectric instrument, including the steps of providing each electromagnet with spaced lugs of magnetic material adapted to slidingly engage similarly spaced lugs on the other electromagnet, the lugs forming a part of the magnetic circuit for one of the electromagnets to a gap-forming member beyond a disk-receiving gap therefrom; placing the two electromagnets in approximately correct relationship to one another with the lugs slidingly engaged to each other, testing the stator as to torque characteristics at higher and lower amperages with the lugs clamped in intimate contact, accurately adjusting the vertical relationship between the two electromagnets after the higher amperage test to approach closely a chosen optimum of torque characteristics prior to the low amperage test, accurately adjusting the left-to-right relationship between the two magnets to approach closely a chosen optimum of torque characteristics on the basis of the lower amperage test, and thereafter welding the intimately engaged lugs for securing the two electromagnets in their exact relative relationship as a separate stator for mounting in a meter without disturbing their relationship.

4. The method of assembling a pair of electromagnets to form a torque-set stator for a dynamoelectric instrument, including the steps of providing each of a pair of electromagnets with spaced portions of magnetic material adapted to slidingly engage similarly spaced portions on the other electromagnet; placing the two electromagnets in approximately correct relationship to one another to form a disk-receiving gap with the said portions slidingly engaged to each other to provide two adjustments of the gap, one as to gap length and one for relative lateral positioning, testing the pair as to torque characteristics, accurately adjusting the relationship between the two electromagnets to approach a chosen optimum of torque characteristics which are subject to being differently affected by the two adjustments, and securing the two electromagnets to each other fixedly in their adjusted relationship.

5. The method of assembling a pair of electromagnets to form a torque-set stator for a dynamoelectric instrument, including the steps of providing each of a pair of electromagnets with spaced portions of magnetic material adapted to slidingly engage similarly spaced portions on the other electromagnet; placing the two electromagnets in approximately correct relationship to one another to form a disk-receiving gap with the said portions slidingly engaged to each other to provide two adjustments of the gap, one as to gap length and one for relative lateral positioning, testing the pair as to torque characteristics at higher and lower amperages, accurately adjusting the relationship between the two electromagnets in two directions of adjustment to approach a chosen optimum of torque characteristics, with a gap spacing between the magnets determined on the basis of the higher amperage test and the relative lateral positioning determined on the basis of the lower amperage test.

6. The method of manufacturing watt-hour meters with a plurality of torque-balanced stators driving a single retarded rotor, which comprises providing each of a plurality of stators by the steps of providing each of a pair of electromagnets with spaced portions of magnetic material adapted to slidingly engage similarly spaced portions on the other electromagnet; placing the two electromagnets in approximately correct relationship to one another to form a disk-reciving gap with the said portions slidingly engaged to each other to provide two adjustments of the gap, one as to gap length and one for relative lateral positioning, testing the pair as to torque characteristics, accurately adjusting the relationship between the two electromagnets to approach for each of the stators the same chosen optimum of torque characteristics which are subject to being differently affected by the two adjustments, and securing the two electromagnets to each other fixedly in their adjusted relationship; and assembling in a meter, with a retarded rotor, at least two of said stators with the stators accurately positioned in like relationship to the rotor to each exert substantially equal torque on the rotor when measuring equal loads.

7. The method of assembling a pair of electromagnets to form a torque-set stator for a dynamoelectric instrument, including the steps of providing each of a pair of electromagnets with spaced portions of magnetic material adapted to slidingly engage similarly spaced portions on the other electromagnet; placing the two electromagnets in approximately correct relationship to one another to form a disk-receiving gap with the said portions slidingly engaged to each other to provide an adjustment of the gap for relative lateral positioning, testing the pair as to torque characteristics under light load energization; accurately adjusting the lateral relationship between the two electromagnets to approach a chosen optimum of light load torque characteristics, and securing the two electromagnets to each other fixedly in their adjusted relationship.

* * * * *